June 16, 1936.　　F. S. MARCELLUS　　2,044,586
RECORDING INSTRUMENT
Filed Feb. 10, 1933
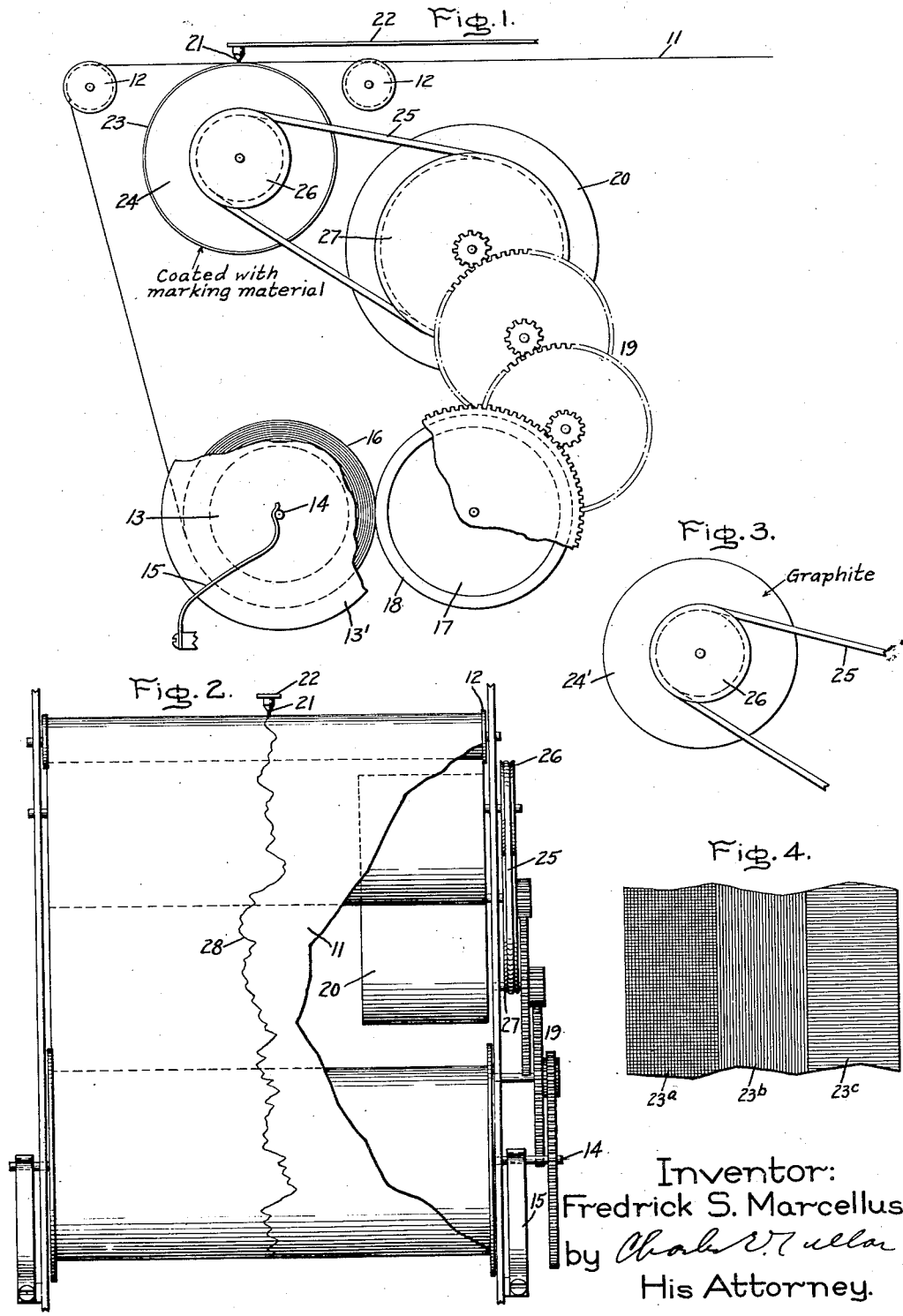
Inventor:
Fredrick S. Marcellus,
by Charles V. Muller
His Attorney.

Patented June 16, 1936

2,044,586

UNITED STATES PATENT OFFICE 2,044,586

RECORDING INSTRUMENT

Fredrick S. Marcellus, Scotia, N. Y., assignor to General Electric Company, a corporation of New York Application February 10, 1933, Serial No. 656,131

5 Claims. (Cl. 234—1)

My invention relates to recording instruments and devices and has for its primary object the provision of sturdy, reliable apparatus for producing a clear and legible record and requiring only very light pressure between the record sheet and the marking device, thereby reducing to a minimum the torque load on the moving element of the indicating instrument or device used in connection with the recording apparatus. Other and further objects and advantages will become apparent as the description proceeds.

In accordance with my invention in its preferred form, a sheet of suitable material forming a record chart is passed under a marking stylus at any desired speed. However, instead of supplying marking material to the stylus directly, a marking member having a surface coated with a suitable marking material is placed in close proximity to the under surface of the record chart under the stylus, and the surface of the marking member is caused to travel at an appreciable velocity with respect to the record sheet. The stylus bears very lightly against the record sheet, thereby causing the portion of the sheet under the point of the stylus to come in contact with the marking material which is deposited upon the record sheet by abrasion and without placing any load upon the movable arm carrying the stylus. Owing to the relatively high velocity of the surface of the marking member, ample material may be deposited for producing a legible record although very light pressure is employed between the stylus and the record sheet.

The features of my invention which I believe to be novel and patentable are pointed out in the claims appended hereto. A better understanding of my invention itself, however, may be obtained by referring to the following description taken in connection with the accompanying drawing in which Fig. 1 represents in schematic form an end elevation of the essential elements forming an embodiment of my invention; Fig. 2 represents the front elevation of the apparatus shown in Fig. 1 with a portion of the record sheet cut away; Fig. 3 illustrates a modified form of marking cylinder which may be used with the apparatus illustrated in Figs. 1 and 2; and Fig. 4 represents the surface of another modified form of marking member.

Referring now more in detail to the drawing in which like reference characters refer to like parts throughout, I have represented at 11 the record chart or sheet in the form of a strip coming from a supply roll (not shown) and passing over the guide rolls 12 to a reroll spool 13.

The record sheet 11 is preferably, but not necessarily transparent or translucent. Although I prefer to utilize a record chart in the form of a strip passing from a supply spool to a reroll spool, it will be understood that my invention is not limited to this specific construction and that it may be applied to any apparatus in which a chart in sheet form may be employed whether said chart is arranged for longitudinal or circular travel. The reroll spool 13 is provided with a shaft 14, the projecting ends of which engage leaf springs 15 which serve to hold the reroll spool 13 against a driving roll 17. The surface 16 of the record strip rolled upon the spool 13 engages the surface of a soft rubber face 18 of the drive roll 17. The drive roll 17 is driven through a chain of gears 19 by means of a constant speed motor 20, for example, a clockwork motor or a synchronous clock motor. The soft rubber face 18 overhands the roll 17 slightly so that the flanges 13' are also engaged lightly by the soft rubber face 18 but with less friction than the engagement between the soft rubber face 18 and the surface 16 of the record roll.

A stylus 21 having a point sharp enough to make a sufficiently fine record line is carried by a transversely movable arm 22. The movable arm 22 is carried by the movable element of an indicating instrument or is connected to the movable element of any other apparatus, the motion of which is to be recorded, but since such apparatus forms no part of the present invention I have indicated the movable element by showing only the end portion 22 of a movable arm. The stylus 21 bears very lightly against the record strip 11, causing the portion thereof under the stylus to be wiped by the surface 23 of a marking cylinder 24 mounted below the record strip 11 with its surface in close proximity thereto.

Although I have referred to a movable stylus, it will be understood that marking would take place in the same manner if the stylus were fixed in position. Obviously, my invention also embraces apparatus having a plurality of fixed or movable styli for any desired purpose. For example, one or more fixed styli may be used for producing a base line or division lines, thereby making unnecessary the use of ruled record sheets.

The surface 23 of the marking cylinder 24 may comprise any suitable material, but I have found that a sheet of carbon paper wrapped around the cylinder 24 may satisfactorily be employed. The marking cylinder 24 is also driven at a constant speed by means of the constant speed motor 20 to which the cylinder 24 is connected by means of the belt 25 connecting pulleys 26 and 27.

The operation of my device is as follows: Since the motor 20 operates at constant speed, the surface of the soft rubber face 18 of the drive roll 17 will travel at constant speed. Consequently since the surface of the soft rubber face 18 engages the surface of the outer layer of record strip wound on the reroll spool 13, the record strip 11 will also be driven at a constant speed, thereby providing suitable timing of the record strip. The friction of the overhanging portion of the soft rubber face 18 against the flanges 13' of the reroll spool 13 assures that the reroll spool 13 will continue to revolve as record strip 11 is drawn past the marking stylus, thereby avoiding a bunching up of record strip at the reroll spool in case there should be a momentary slippage between the top layer 16 of the record strip and the rest of the strip wound on the roll. Obviously, this feature also guards against any interruption of the travel of the record strip 11 by any momentary slight slippage of the soft rubber face 18 on the surface 16 of the roll of record strip. However, the friction between the surface of the soft rubber face 18 and the record-strip surface 16 is normally greater than the friction between the overhanging portion of the soft rubber face 18 and the flanges 13', and the travel of the record strip is normally produced and determined by the motion of the peripheral surface of the soft rubber face 18.

It will be observed from the drawing that the surface of the marking cylinder 24 is arranged to travel at a relatively higher velocity than the record strip 11. Although I am not limited to any given range of velocities, I have found, for example, that suitable results may be obtained by giving the marking roll 24 a peripheral speed of about 10 inches per minute.

Although the stylus 21 bears very lightly against the record strip 11, owing to the relative motion between the marking surface 23 and the under surface of the record strip 11, sufficient material is deposited upon the record strip 11 to form a clear record. The action is analogous to passing a pencil or a stylus across a sheet of paper very lightly a large number of times instead of only a single time with greater pressure. Owing to the fact that the pressure of the stylus may be very light, a relatively sharp stylus may be employed without tearing the record sheet, thereby producing a fine record curve 28.

Since, in my proposed arrangement, the marking material is supplied to the record strip independently of the stylus or the movable arm, the construction readily permits causing the record to appear in different colors in different ranges of recorded values. For example, in Fig. 4 I have shown a portion of a modified type of marking band 23 which might be carried by the marking roll 24. In this modification, the band 23 comprises a number of adjacent bands of carbon paper 23a, 23b, and 23c, respectively, which may, for example, be colored black, red, and blue, respectively. If this modification is employed, readings within a given intermediate range will produce a red record curve and readings falling on either side of this predetermined intermediate range will produce black or blue portions of the record curve, as the case may be.

Another modification which I have found highly satisfactory and somewhat preferable from the standpoint of durability to the use of a band of carbon paper is that illustrated in Fig. 3. In this modification a graphite cylinder 24' is substituted for the marking cylinder 24. The surface of this cylinder serves as the marking material in the same manner as the carbon surface of the carbon band 23. Since graphite may readily be impregnated with inks and various other substances, the visibility of the record and the durability of the marking device may be further enhanced by impregnating the graphite cylinder 24 with a suitable material. Various inks preferably slow-drying inks have been found satisfactory. Merely impregnating the graphite cylinder 24' with glycerine also serves to cause a brilliant and clearly discernible record curve to be deposited upon the under surface of the record sheet 11. It will be apparent that whichever form of marking material I employ, my apparatus not only has the advantage of enabling a clear record to be obtained with only a negligible torque load upon the movable element carrying arm 22, but that the apparatus also has the advantage that it may be operated for considerable periods of time without attention since there are no ink wells to be refilled.

In accordance with the provisions of the patent statutes I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. In combination, a movable record chart for a recording instrument, a cylinder located below said record chart having a surface comprising marking material in close proximity to the under surface of said chart and having its axis substantially perpendicular to the direction of motion of a point on said chart, a movable arm carrying a stylus arranged to bear lightly on the upper surface of said chart, and means for revolving said cylinder at a speed causing its surface to travel at an appreciably higher velocity than said record chart, thereby causing marking material to be deposited upon the under surface of said chart at a point below said stylus and providing a record of the positions of said stylus with respect to said record chart.

2. In combination, a movable record chart for a recording instrument, a marking member located below said record chart having a circular cross-section and a surface comprising marking material in close proximity to the under surface of said chart, a stylus arranged to bear lightly on the upper surface of said chart, and means for revolving said marking member at a speed causing its surface to travel at an appreciably higher velocity than said record chart, thereby causing marking material to be deposited upon the under surface of said chart at a point below said stylus.

3. In a recording instrument having a movable record strip, the combination of said movable record strip, a marking member located below said strip having a circular cross-section and having a surface comprising marking material in close proximity to the under surface of said strip, said marking surface comprising a plurality of bands narrower than said strip and of different colors, a stylus arranged to bear lightly on the surface of said strip, and means for rotating said marking member causing its surface speed to be appreciably higher than that of said record strip, thereby causing marking material to be deposited upon the under surface of said strip at a point below said stylus and providing a record of the position of said stylus with respect to said record strip, said record having distinctive colors in different ranges.

4. A recording device comprising in combination a record chart in sheet form, a marking member located below said record chart and having a surface comprising marking material in close proximity to the under surface of said chart, a movable arm carrying a stylus arranged to bear lightly on the upper surface of said chart, and means for causing relative motion between the marking surface of said marking member and said record chart in a direction parallel to said surfaces, thereby causing marking material to be deposited by abrasion upon the under surface of said chart at a point below said stylus and providing a record of the positions of said stylus with respect to said record chart.

5. Apparatus for producing linear markings on a traveling sheet, comprising a stylus and a marking member supported on opposite sides of said sheet, said marking member having a surface carrying marking material and traveling, in the portion adjacent said traveling sheet, parallel thereto but at a higher velocity, and said stylus being arranged to bear lightly against said traveling sheet and to press the portion of said sheet adjacent said stylus lightly against said relatively moving marking surface.

FREDRICK S. MARCELLUS.